(12) United States Patent
Filev

(10) Patent No.: US 10,338,764 B2
(45) Date of Patent: Jul. 2, 2019

(54) APPLICATION INTEGRATION SYSTEM AND METHOD

(71) Applicant: Wrike, Inc., Mountain View, CA (US)

(72) Inventor: Andrey Filev, San Jose, CA (US)

(73) Assignee: WRIKE, INC., San Jose, CA (US)

(*) Notice: Subject to any disclaimer, the term of this patent is extended or adjusted under 35 U.S.C. 154(b) by 207 days.

(21) Appl. No.: 14/262,589

(22) Filed: Apr. 25, 2014

(65) Prior Publication Data

US 2015/0312324 A1 Oct. 29, 2015

(51) Int. Cl.
*G06F 3/048* (2013.01)
*G06F 3/0481* (2013.01)
*G06F 16/00* (2019.01)

(52) U.S. Cl.
CPC ............ *G06F 3/0481* (2013.01); *G06F 16/00* (2019.01); *G06F 2203/04803* (2013.01)

(58) Field of Classification Search
None
See application file for complete search history.

(56) References Cited

U.S. PATENT DOCUMENTS

| 5,826,025 | A | * | 10/1998 | Gramlich | G06F 17/241 709/217 |
| 2008/0216023 | A1 | * | 9/2008 | Berglund | G06F 17/30887 715/855 |
| 2008/0256614 | A1 | * | 10/2008 | Hagiuda | H04N 1/00204 726/5 |

* cited by examiner

*Primary Examiner* — William C Trapanese
(74) *Attorney, Agent, or Firm* — David R. Stevens; Stevens Law Group

(57) ABSTRACT

Systems and methods are disclosed for integrating with a first remote application with a second application that may also be remote. A module of the browser may generate a task with respect to an interface rendered in the browser. A task may be stored with a reference to the interface, which may be represented by a URL. Upon subsequent accessing of the interface, the module may then determine that one or more tasks have been associated with that URL and present them with the interface, such as superimposed on the interface in the form of a link to the one or more tasks or some other visual indicator that tasks are associated with that interface. A configuration file may define where the visual indicator is superimposed on the interface. Tasks generated may be integrated with a second remote application implementing project management or other functions.

20 Claims, 5 Drawing Sheets

APPLICATION INTEGRATION SYSTEM AND METHOD

BACKGROUND

Field of the Invention

This invention relates to systems and methods for integrating applications, and, more particularly to integrating software as a service (SaaS) applications.

Background of the Invention

Many software applications are offered as a "software as a service" (SaaS), wherein a user subscribes to access to an application hosted on remote server rather than purchasing an installation medium (e.g. CD). SaaS applications provide a challenge for integration with other applications. For example, a vendor may expose an application programming interface (API) for a SaaS application, but charge a fee for such access and impose confidentiality or other restrictions. Developers must further familiarize themselves with the API and accept any restrictions and conventions imposed by the API. Where a developer must integrate an application with multiple SaaS applications, the costs of doing so may be prohibitive.

The systems and methods disclosed herein provide an improved approach to integrating with SaaS and other applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
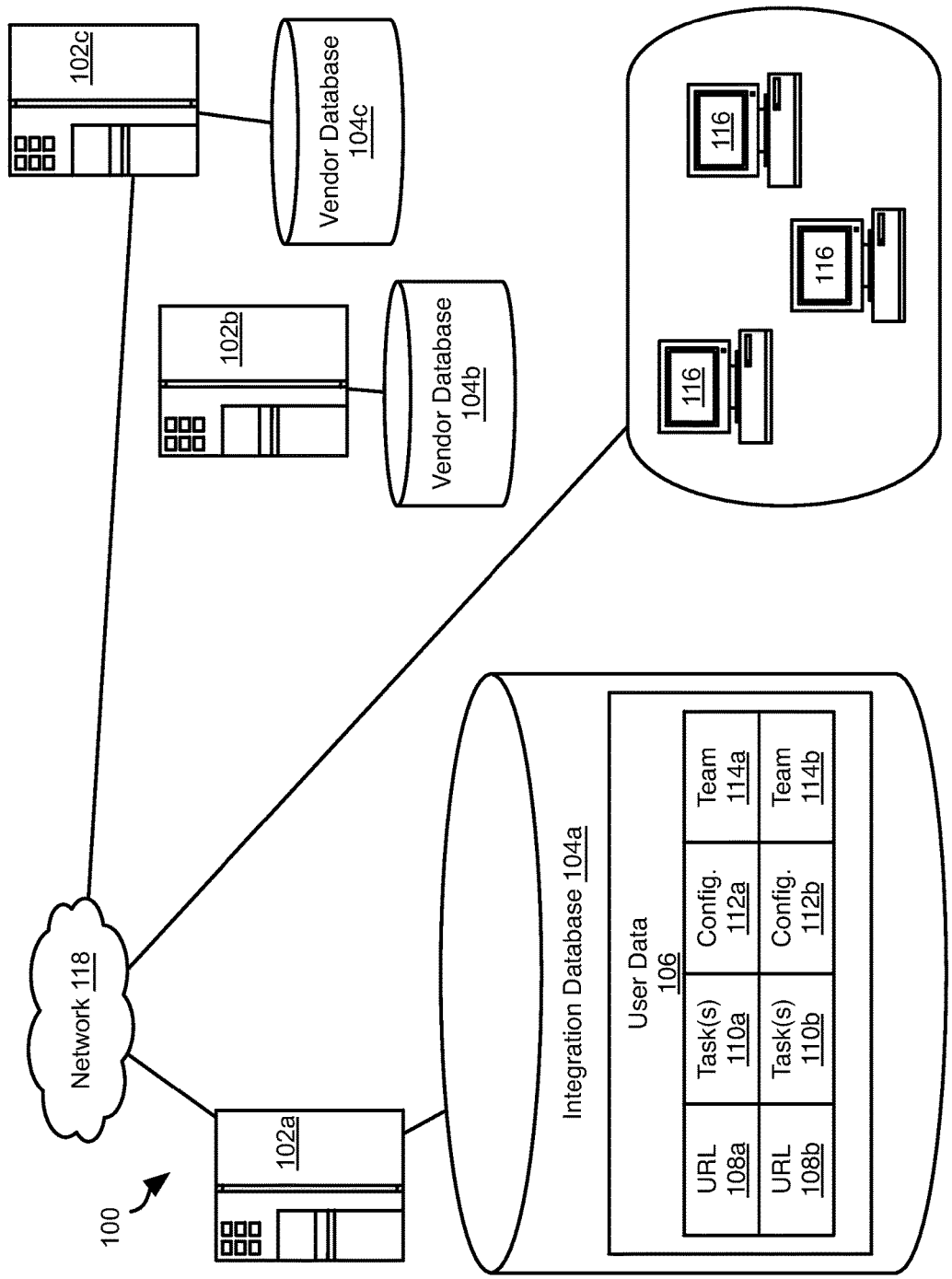
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide systems and methods for integrating with a first application, such as a first application that is executing remotely and accessed by means of an interface presented within a browser. A module executing within the browser may be invoked by a user to generate a task with respect to the interface. A task is created and stored with a reference to the interface, which may be a specific interface represented by a URL. Upon subsequent accessing of the interface, the module may then determine that one or more tasks have been associated with that URL and present them with the interface, such as superimposed on the interface in the form of a link to the one or more tasks or some other visual indicator that tasks are associated with that interface. A configuration file may define where the visual indicator is superimposed on the interface.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102a operable to execute an application implementing methods as described herein. In particular, the server system 102a may provide a SaaS application that is accessed and interacted with by means of a browser or client application executing on a user computing device.

One or more other server systems 102b, 102c may also prove a SaaS application, or other web-based interface, to remote users that access the application by means of a browser or client application executing on a user computing device. The system and methods herein may provide means for an application executing on the server system 102a to integrate with applications provide by the server system 102b, 102c without requiring access to APIs of these applications. The systems and methods disclosed herein may particularly advantageously used with respect to customer relationship management (CRM) applications such as SALESFORCE, or the like. Other applications such as social media interfaces (FACEBOOK, GOOGLE+, TWITTER, LINKEDIN, etc.) may also be integrated according to the methods described herein. The systems and methods disclosed herein may also be used to integrate collaboration applications, such as GOOGLE Apps for business, MICROSOFT OFFICE 365, enterprise resource planning (ERP) software, financial applications (e.g. from ORACLE or SAP), project management software, e-commerce software, marketing software, and the like.

The applications provided by the server systems 102a-102c may store and access data within corresponding databases 104a-104c. Vendor databases 104b, 104c may store executable and operational data for users accessing the applications. For example, vendor databases 104b, 104c may store data with respect to individual users within specific user accounts. A user account may be an account for an organization or a sub-account associated with such an account and used and modified according to usage of individuals or departments of that organization.

The server system 102a may include an integration database 104a that includes user data 106. Again, the user data 106 may be for a specific user or an organization. User data 106 may be part of a collection of user data 106 for individuals or departments associated with a common organization.

User data 106 may include a plurality of entries that may each include, or be linked or otherwise associated with, such information as a uniform resource locator (URL) 108a, 108b; tasks 110a, 110b; a configuration file 112a, 112b; and a team 114a, 114b or one or more team members or other users associated with an entry. The manner in which the data fields of each entry are generated and used will be described in greater detail below.

The server systems 102a-102c may be accessed by user devices 116 remote from the server systems 102a-102c. The devices 116 may be desktop or laptop computers, tablet computers, smart phones, wearable computers, or any other computing device. Systems and methods disclosed herein may also be implemented on a user device 116. Accordingly, the user data 106 for a particular user or group of users may be stored on or accessed by the user device 116 independent of the server system 102a.

Communication between servers 102a-102c and user devices 116 may occur over a network 118 such as the Internet, local area network (LAN), wide area network (WAN) or any other network topology. Network connections between devices may include wired or wireless connections.

Figure 2:
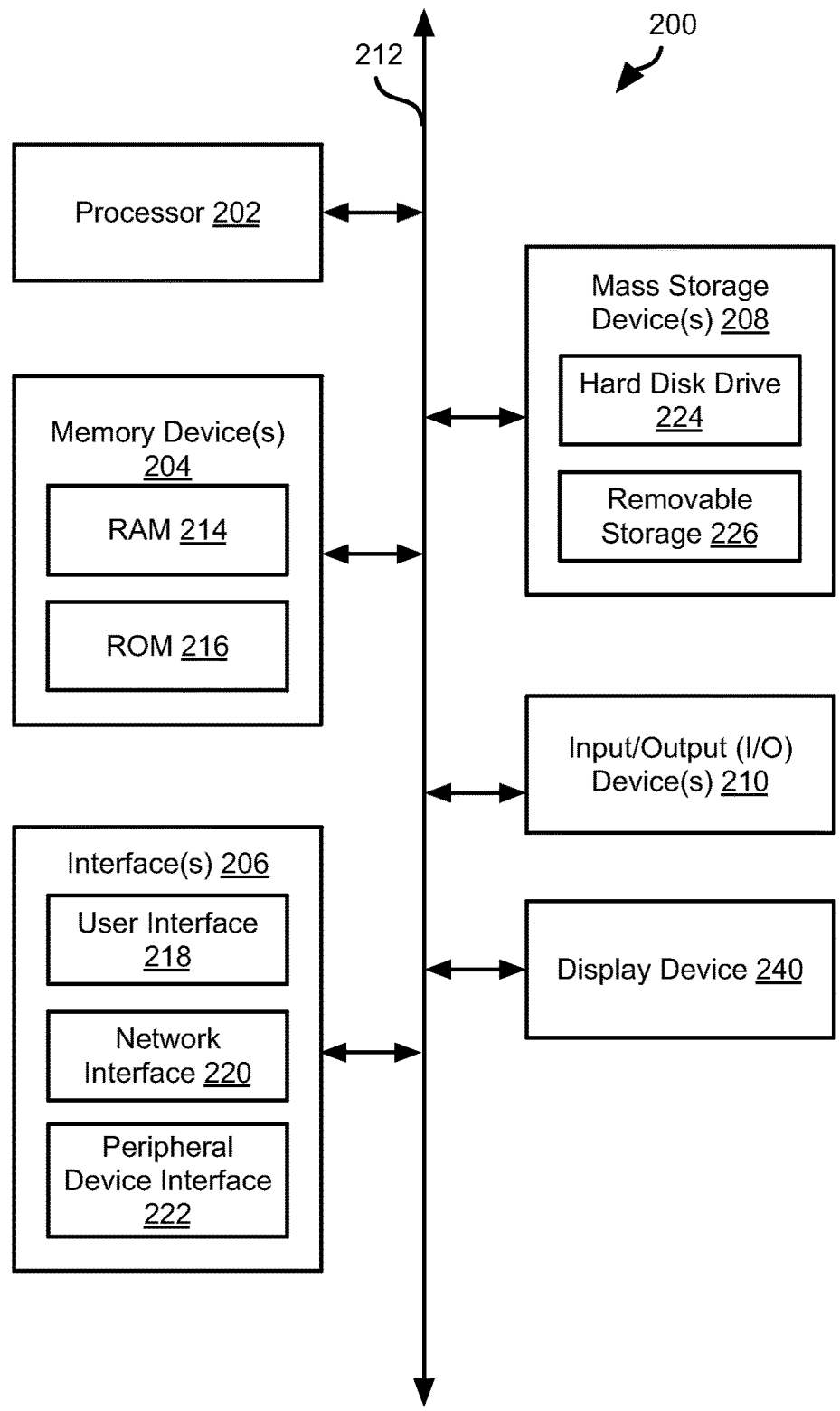
FIG. 2 is schematic block diagram of a computer system suitable for implementing methods in accordance with embodiments of the invention.

FIG. 2 is a block diagram illustrating an example computing device 200. Computing device 200 may be used to perform various procedures, such as those discussed herein. A server system 102a-102c or user device 116 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102a-102c may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
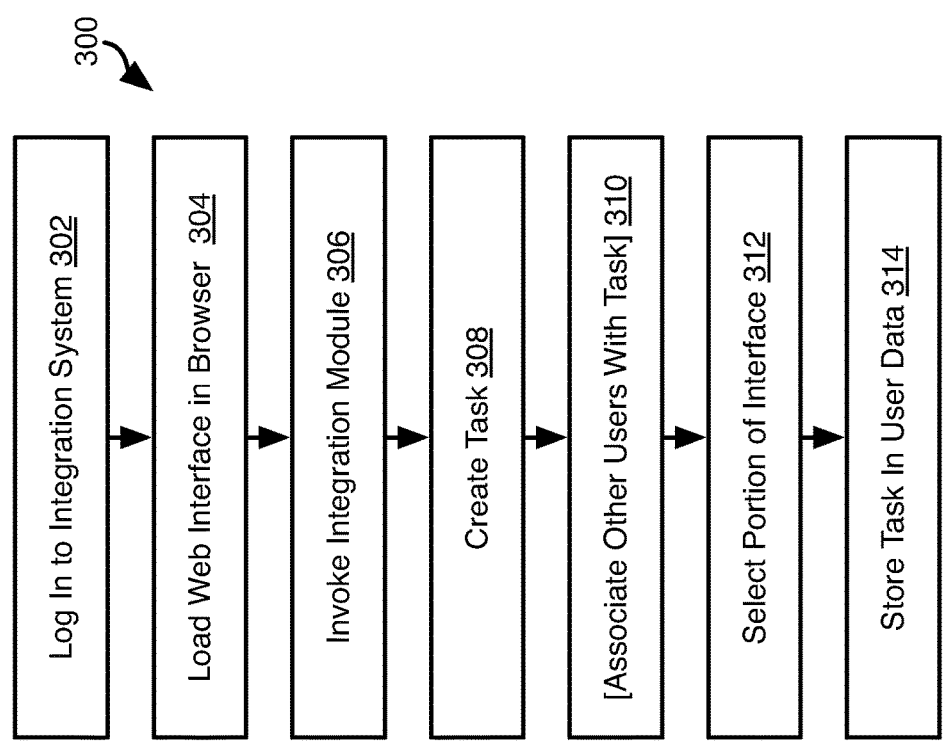
FIG. 3 is a process flow diagram of a method for integrating with an application in accordance with an embodiment of the present invention.

Referring to FIG. 3, the illustrated method 300 may be used to integrate between different applications and is particularly useful for integrating with a SaaS or other web-based application, which may include a web page including any web-based functionality known in the art.

The method 300 may include logging 302 in to an integration system. For example, a browser executing on a user device may host a plugin or other software module, hereinafter referred to as an "integration module." For example, the integration module may be a CHROME application or a plugin to a browser such as FIREFOX, OPERA, INTERNET EXPLORER, or the like. For example, an EVERNOTE extension, POCKET, or some other plugin may be used. The integration module may implement a remote login to server system 102a. Accordingly, the integration module may receive a user name and/or password and use this information to log in to an application executing on the server system 102a, hereinafter referred to as an "integration application." A login interface to the integration module may be invoked by means of button, menu item, keyboard shortcut, gesture, or some other input provided to the browser and associated to the integration module by the browser. The user name and/or password specified during login may be associated with the user data 106 of a particular user.

The method 300 may further include loading 304 an interface in the browser to a different remote application, such as a SaaS application or other application or web page provided by a server system 102b, 102c. The method may further include invoking 306 the integration module, such as in response to a user instruction in the form of clicking on a menu item, button, link, or other interface element or inputting a keyboard stroke, gesture, or some other input associated by the browser with invoking of the integration module.

The method 300 may further include creating 308 a tasks in response to the invoking 306. For example, a task may be created that includes a reference to the interface presented in the browser at the time of the invoking 306, which may include a URL. For example, where the interface is to a CRM application and indicates that a deal has been closed, a task may be created with respect to that interface that indicates that fulfillment of the deal should now be performed.

A dialog may also be presented in response to the invoking 306 in which a user may specify such information as a target completion date and/or time, a task description, a project to which the task relates, or data defining any other task or project management function known in the art. In some embodiments, the method 300 may further including associating 310 one or more other users with the task, this may include receiving input, through the same or a different dialog, of an assignee for the task, a group of users associated with the task, or other specification of users to be recorded as associated with the task.

In some embodiments a user may select 312 a portion of the interface with which to associate a task. For example, the user may click or otherwise select a portion of the interface and the integration module may record the portion, such as a specific area or user interface element, that was selected as part of the task.

The task including some or all of the data described herein as being associated therewith may then be stored 314. The task may be stored on a user computing device on which the browser is executing and may additionally or alternatively be transmitted to a server system 102a for storage in the user data 106 of the user specified in the login step 302.

Figure 4:
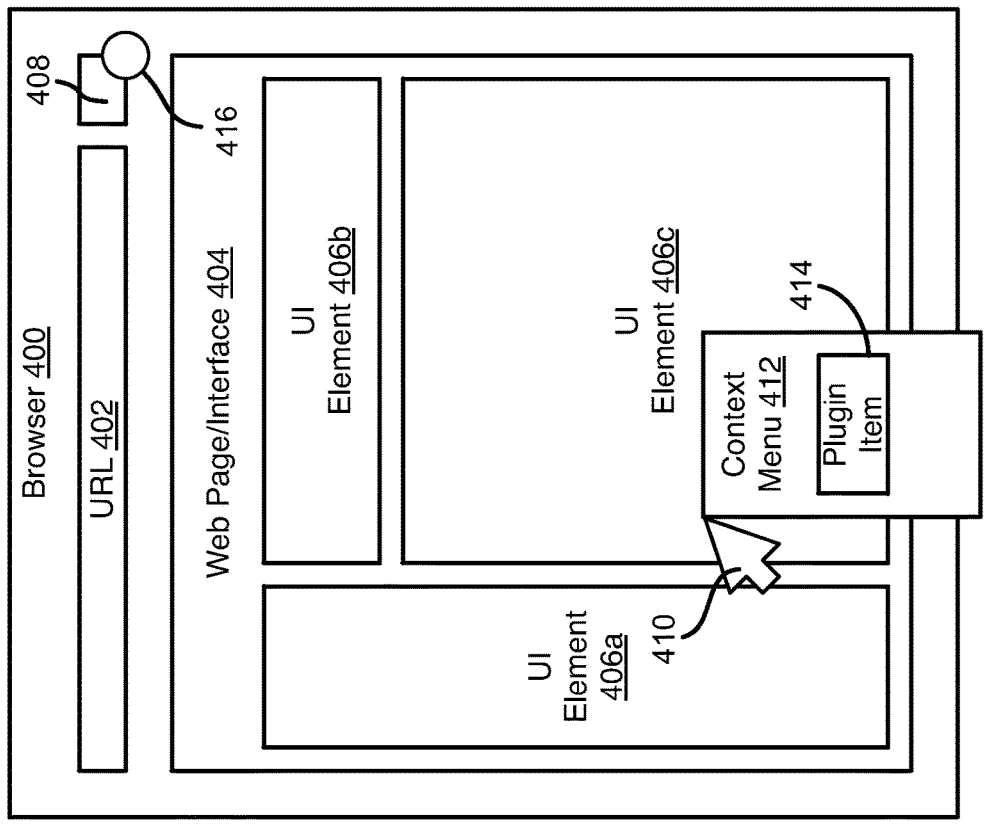
FIG. 4 is schematic diagram of a browser-based interface for integrating with an application in accordance with an embodiment of the present invention.

FIG. 4 illustrates an interface in which the method 300 may be executed. The interface may include a browser window 400 displayed on a display of a user device 116. The browser window 400 may receive or display a URL 402 defining the interface 404 (e.g. web page) that is currently rendered in the browser 400. The interface 404 may include one or more user interface (UI) elements 406a-406c displayed therein.

The integration module embedded in the browser may cause a button 408 or other interface element to be displayed on the browser window 400. The invoking 306 of the integration module may be performed by a user selecting that button 408. In some embodiments, a user may invoke display of a context menu 412 by selecting a point within the interface 404, e.g. by right clicking, long clicking, tapping with two fingers, or performing other interactions defined by a given operating system and requesting display of a context menu, which may include a physical gesture, voice command, or any other input modality. The context menu 412 may include a menu item 414 that invokes the integration module. Accordingly, the invoking 306 step may include selection of the menu item 414. In some embodiments selecting 312 a portion of the interface 404 may be the same step that invokes the context menu 412. That is, the user interface element 406a-406c that a user selected when invoking the context menu 412 may be determined by the integration module to be the selected portion. In some embodiments, a visual indicator 416 may be presented, such as on or near the button 408, the visual indicator 416 indicating a number of tasks, if any, associated with the interface 404. In some embodiments, some or all of the selected user interface element 406a-406b may be linked to the task and may be highlighted upon subsequent displays of the interface 404. In some embodiments, other users accessing the interface 404 may be presented the visual indicator as well, i.e. users other than the user that created the task or to whom the task is assigned, such as supervisors or members of the same team. The other users may be determined based on organizational data or by a specified list of associated users when creating a task. Some or all of the content of the selected interface element 406a-406b may also be displayed with the task when viewed elsewhere, such as in an interface provided by the server system 102a.

Figure 5:
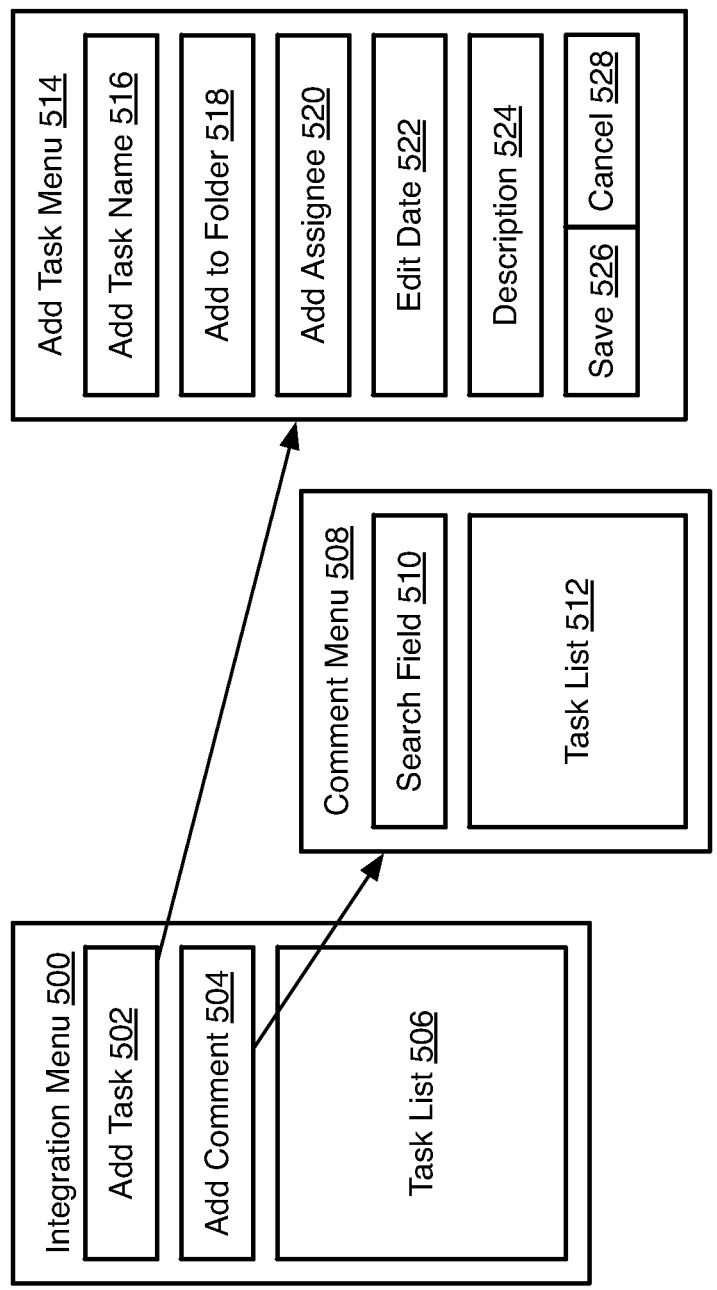
FIG. 5 is schematic block diagram of menus enabling integration with an application in accordance with an embodiment of the present invention.

FIG. 5 illustrates menus and/or dialogs that may be invoked responsive to the invoking step 306, such as by selecting of the button 408 or context menu item 414. For example, an integration menu 500 may be displayed that include an interface element 502 that, when selected, instructs the integration module to add a task. The menu 500 may include an interface element 504 that, when selected, instructs the integration module to add a comment. Integration menu 500 may further include a task list 506 including any tasks defined with respect to the interface 404 displayed in the browser window 400 at the time of the invoking 306 or with respect to which the invoking step 306 was performed. The task list 506 may include references to one or more tasks and each reference may be a link that, when selected by a user, instructs the integration module to display one or both of additional information with respect to the task and interface elements for invoking functions with respect to the task. Functions may include instructing the integration module to delete a task, edit a task, mark task as complete, commenting on a task, or some other function.

In response to selection of element 504, a comment menu 508 may be displayed by the integration module. The menu 508 may include a search field 510. Upon receiving an input to the search field and instruction to perform a search, the integration module may search tasks and/or comments previously associated with the interface 404 according to the methods described herein as well as other tasks that may be generated by other means, such as project management software, calendaring software, or any of the types of software disclosed herein that may be integrated using the disclosed methods. The comment menu 508 may further include a task list 512 including references to one or more tasks associated with the interface 404. The task list 512 may include the most recently generated tasks, or tasks with the most recent due dates, or some other selection of tasks associated with one or both of the user and the interface 404. When selection of one of these references to a task is detected, the integration module may invoke a dialog for receiving text from a user and storing the text in association with the selected reference, such as in user data 106. In addition to text, the integration module may also receive designations of files, folders, photos, screen shots, videos, or other types of data and add the designated data, or links to the designated data, to data associated with the task in the user data 106.

In response to selection of element 502, an "add task" menu 514 may be displayed by the integration module. The menu 514 may include various interface elements that may be used to add information to a task and edit information associated with a task. Upon detecting selection of interface element 516, the integration module may provide an interface for entering a name for the task. Upon detecting selection of interface element 518, the integration module may provide an interface for the task into a folder/project/workspace, e.g a folder stored on the user computing device or accessed through the server system 102a, such folder can be already or later shared with other team members, and thus make the task visible to them in 102a or through 306/408/416/etc. in 102b. Upon detecting selection of interface element 520, the integration module may provide an interface for adding an assignee (e.g. another user) to a task, e.g. a user who will be charged with completing the task. Upon entering a user as an assignee, a task may be associated with the user data 106 of the assignee and the assignee may be able to view the task and update completion status of the task according to the methods described herein.

Upon detecting selection of interface element 522, the integration module may provide an interface for editing or adding a completion date for the task. Upon detecting selection of interface element 524, the integration module may provide an interface for entering a description for a task, which may include an interface for receiving files, photos, videos, audio files, or any other type of data.

Upon detecting selection of interface element 526, the integration module may invoke storage of data added or modified by means of any of the interface elements 516-524, such as storage in the user data 106 of the user logged previously in by means of the integration module. Of course, in some embodiments, the task may be automatically saved without further input from the user. Upon detecting selection of interface element 528, the integration module may ignore data added or modified by means of any of the interface elements 516-524.

Figure 6:
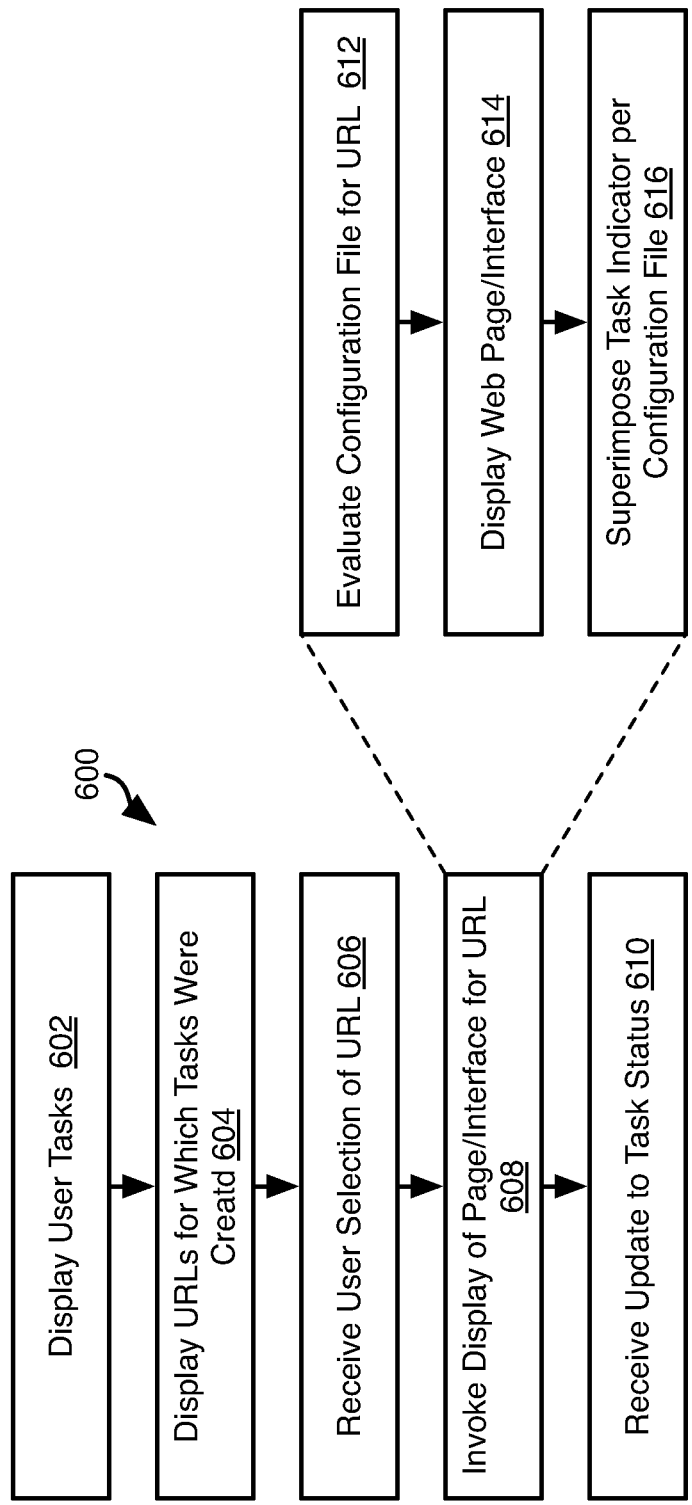
FIG. 6 is a process flow diagram of a method generating tasks with respect to another application in accordance with an embodiment of the present invention.

Referring to FIG. 6, tasks generated as described hereinabove may be accessed in two ways 1) by an interface to the user data 106 provided by the server system 102a or some other system, hereinafter referred to as an "integration interface"; and 2) by navigating to the interface (e.g. interface 404) for which the task was created. In some embodiments, a user may login to the integration module by means of a user name and a password. The login process may include verifying with the server system 102a by the integration module that the user name and password correspond to a user account and only allowing access by the server system 102a and/or integration module to data associated with that account. If the user logged in to the integration module does not correspond to a user associated with a particular task referencing a particular interface, then some or all of the following steps of the method 600 may be omitted, i.e. the computer system may refrain from executing them. As noted above, a task may be associated with a user account. Accordingly, only a user having a task associated with the account thereof as confirmed by login data will be able to view tasks according to the methods described herein. As noted above, a task may be associated with the account of the user that created the task and/or other accounts of other users with which the task is shared either explicitly or due to the other users being team members of the user that created the account or them being members of shared project or workspace or group.

In still other embodiments, a task may be public such that other visitors to the interface may view the task regardless of whether they are logged in, belong to the same team, project, or workspace of the user that created the task or otherwise have been associated with the task. The integration module executing within the browser may therefore display tasks upon a user visiting the site regardless of the user's authentication information.

The illustrated method 600 may be executed with respect to an integration interface displayed on a user device, such as within a browser window. The method 600 may include displaying 602 user tasks. Tasks may be displayed 602 in a calendar view with a reference to a task displayed on a day, month, or other time interval in which the tasks is to be completed. Tasks may be filtered. For example, the calendar may show only tasks associated with a particular interface 404 or a plurality of interface 404 for which tasks have been created according to the methods disclosed herein. Tasks may also be presented in lists. Tasks may also be grouped by the interface 404 for which they were created. Thus a user may select a reference to an interface 404 and invoke display of tasks associated with that interface.

The method 600 may further include display a URL or other reference to the interface 404 associated with a task. Upon receiving 606 a user selection of the URL, or user interface linked to that URL, the method 600 may include invoking 608 display of the interface 404 associated with the URL or other reference, which may include displaying a web page or other browser-based interface. A user may then update the tasks, which may include editing the tasks, marking tasks as complete, adding comments, and the like, using the interfaces shown in FIG. 5. These updates may then be received 610 by the integration module and used to update the user data 106.

In some embodiments invoking 608 display of the interface 404 may include superimposing a visual representation of one or more tasks associated with the interface 404. In some embodiments, a configuration file may be generated for an interface 404, or class of interfaces 404. For example, a particular vendor may display various interfaces in a common format. Accordingly, a configuration file may apply to some or all interfaces from that vendor.

In many applications, web documents are standardized. Accordingly, if one wishes to tie a visual representation to a particular part of the web page, the integration module may access to that HTML, XML, or other content in order to identify the appropriate part of the page and add code for rendering the visual representation. The configuration file itself may also be written in HTML, XML, or some other formatting language to identify an exact location on a page to place the visual representation.

Accordingly, the method 600 may invoke 608 display of the interface 404 by evaluating 612 the configuration file associated with the interface 404, displaying 614 the interface 404, and superimposing 616 a visual indicator of the task according to the configuration file. For example, a title of the task or a symbol indicating that one or more tasks exist may be superimposed over, or positioned beside, a user interface element specified in the configuration file.

For example, a vendor may include one or more "document model add ons" (DOMA) that may be of the form "<div class='accountID1234'>." Accordingly, upon detecting a DOMA specified in a configuration file, the visual indicator for a task may be superimposed on or by the element labeled with that DOMA. As noted above, the element by which the visual indicator for a task is superimposed may be determined by the user clicking on that element and invoking a context menu item to create a task.

In some embodiments where a configuration file does not exist a location within an interface may be identified automatically and a corresponding configuration file may also be generated. In particular patterns within an interface associated with a URL or other reference may be identified. For example, by examining inside the code (e.g. HTML, XML) defining an interface page, the integration module may identify specific text or specific HTML tags to which the visual indicator may be attached.

Over time the formatting language of an interface may change as may coding conventions. According, for a given web page, a hierarchy of tags may be identified (e.g. HTML, XML tags). For example, a typical tag is "<DIV>." The hierarchy accordingly defines a path to every part of a content in the web page. Accordingly the integration module may identify a path to some predetermined text with which a task is to be associated, for example, in order to determine where to attach the visual indicator. If the page changes, and the path becomes different, heuristics could be used to determine a new path. Configuration files may also be facilitated to identify the new path. For example, a task may originally be attached to a <div> portion of an interface with a specific "class" equality and "account" value. By examination of the code (e.g. HTML, XML) of the interface a user may easily determine parameters for configuration file to specify where the visual indicator should be placed. As an example a configuration file may effectively instruct "attach visual indicator to the tag, or class, or any other identifiable part of an HTML," in that order. In other embodiments, the visual indicator may simply attach upon a first occurrence of some search string such that whenever on a particular page with a particular URL, whenever a given "% selected_string %" occurs the visual indicator may be presented, such as including text "3 tasks attached"

Applicant notes that the services offered by the integration application may include more than managing tasks with respect to the interfaces of other applications according to the methods disclosed herein. For example, various collaboration, communication, social networking, project management, email management and plugins, and other management tools may also be implemented and integrated with the tasks generated according to the methods disclosed herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for application integration comprising:
    receiving, by a first browser executing on a user computing device, an instruction to navigate to a uniform resource locator (URL) referencing a remote computing device;
    requesting, by the first browser, an interface corresponding to the URL;
    receiving, by the first browser, the interface;
    rendering, by the first browser, the interface, the interface defining interface elements for interacting with a first remote application executing on a first remote server;

receiving, on the user computing device, an instruction to a first module executing within the first browser to generate a data object with respect to the interface; and in response to receiving the instruction—
generating, by the first module, the data object, the data object including a status;
including, by the first module, the URL in the data object; and
storing, by the first module, the data object on a second remote server that is different from the first remote server;
receiving, by a second browser executing a second module such that one of (a) the second browser is the first browser and the second module is the first module and (b) the second browser is a different browser and the second module is a different module executing on the different browser, a subsequent instruction to navigate to the URL;
again requesting, by the second browser, the interface from the URL;
receiving, by the second browser, the interface;
(i) rendering, by the second browser, the interface;
detecting, by the second module, the subsequent instruction to navigate to the URL;
determining, by the second module, that the data object includes the URL;
in response to both of (a) detecting the subsequent instruction to navigate to the URL and (b) determining that the data object includes the URL, rendering, by the second module after performing (i), a visual reference to the data object superimposed on the interface;
receiving, by the second module, an update to the status of the data object; and
in response to receiving the update to the data object, updating, by the second module, the status of the data object on the second remote server.

2. The method of claim 1, wherein the data object is a task, the method further comprising:
receiving, on the user computing device, a task description; and
storing the task description in the task.

3. The method of claim 2, further comprising:
receiving, on the user computing device a date; and
storing the date in the data object.

4. The method of claim 2, further comprising:
receiving, on the user computing device, identifiers associated with one or more other users; and
associating the one or more other users with the task.

5. The method of claim 1, wherein storing the data object comprises:
storing, by a second remote server system, the data object in account data of the first user in a database remote from the user computing device.

6. The method of claim 5, wherein the first remote application is a software as a service application.

7. The method of claim 5, wherein storing the data object is performed by a software as a service application executed by the second remote server system.

8. The method of claim 5, further comprising:
rendering, by the browser or a different browser, on the user computing device, an interface to a second remote application, the interface to the second remote application including a listing of the task and one or more other tasks stored in the account data of the first user;
receiving, on the user computing device, selection of the task;
in response to receiving selection of the task, retrieving, by the browser or the different browser, the interface to the first remote application using the reference associated with the data object; and
rendering, by the browser or the different browser, the interface to the first remote application.

9. The method of claim 1, wherein the interface is a web page.

10. The method of claim 1, wherein determining that the data object includes the URL comprises:
logging in at least one of the first user and a second user to the module executing in the browser or the different browser;
retrieving tasks associated with the at least one of the first user and the second user and the interface to the first remote application; and
determining that the data object is one of the retrieved tasks.

11. The method of claim 10, further comprising:
determining from a configuration file associated with the interface to the first application a portion of the interface to the first application; and
wherein rendering the visual reference to the task superimposed on the interface to the first remote application comprises rendering the visual reference on the portion.

12. The method of claim 1, wherein:
receiving the instruction to a module executing within the browser to generate the data object with respect to the interface comprises receiving a user selection of a portion of the interface to the first remote application; and
associating a reference to the interface to the first remote application with the data object comprises associating a reference to the portion of the interface to the first remote application with the data object.

13. The method of claim 1, further comprising:
receiving, by the browser or a different browser, navigation to the interface to the first application;
rendering, by the browser or the different browser, the interface to the first application
detecting, by the module executing within the browser, navigation to the interface to the first application interface;
determining that the task has the reference to the interface to the first remote application with the data object; and
in response to determining that the task has the reference to the interface to the first remote application, rendering a visual reference to the task superimposed on the portion of the interface to the first remote application.

14. The method of claim 1, further comprising:
evaluating, by the browser, a configuration file for the URL;
selecting, by the browser, a selected element of the interface in the configuration file;
wherein rendering the visual reference to the data object superimposed on the interface comprises superimposing the visual reference on a rendering of the selected element.

15. The method of claim 1, wherein receiving the instruction to the module executing within the browser to generate the data object with respect to the interface comprises receiving a selection of a selected element of the interface; and
wherein rendering the visual reference to the data object superimposed on the interface comprises superimposing the visual reference on a rendering of the selected element.

16. A computer system comprising one or more processors and one or more memory devices operably coupled to the one or more processors, the one or more memory device storing executable and operational data effective to cause the one or more processors to:
  render, by a browser, an interface to a first remote application executing on a first remote server with respect to an account of a first user, the first interface retrieved using a uniform resource location (URL);
  receive an instruction to a module executing within the browser to generate a data object with respect to the interface;
  in response to receiving the instruction—
    generate the data object;
    including with the data object, the URL and references to an account of the first user and accounts of one or more second users; and
    store the data object on a second remote server that is different from the first remote server;
  receive, by the browser, navigation to the URL;
  (i) render, by the browser, the interface to the first application by requesting the interface from the URL;
  detect by the module executing within the browser, navigation to the URL;
  determine that the data object includes the URL; and
  evaluate a user identifier currently logged into the module;
  if all of (a) navigation to the URL is detected, (b) the data object has the reference to the URL, and (c) the user identifier currently logged into the module corresponds to an account of at least one of the first user and one of the one or more second users, then (d) render, after performing (i), a visual reference to the data object superimposed on the interface to the first remote application, (e) receive user updates to the data object, (f) modify the data object on the second remote server according to the user updates;
  if the user identifier currently logged into the module does not correspond to an account of any of the first user and the one or more second users, refrain from rendering the visual reference to the data object superimposed on the interface to the first remote application.

17. The computer system of claim 16, wherein the data object is a task, the operational and executable data are further effective to cause the one or more processors to:
  receive a task description, the task description including a date; and
  store the task description in the task.

18. The computer system of claim 16, wherein the executable and operational data are further effective to cause the one or more processors to store the data object by instructing a second remote server system to store the data object in account data of the first user in a database remote from the computer system.

19. The computer system of claim 18, wherein the executable and operational data are further effective to cause the one or more processors to:
  render, by the browser or a different browser, an interface to a second remote application, the interface to the second application including a listing of the task and one or more other tasks stored in the account data of the first user;
  receive a selection of the task;
  in response to receiving selection of the task, retrieve, by the browser or the different browser, the interface to the first remote application using the reference associated with the data object; and
  render, by the browser or the different browser, the interface to the first remote application.

20. The computer system of claim 16, wherein the executable and operational data are further effective to cause the one or more processors to determine that the task has the reference to the interface to the first remote application with the data object by:
  logging in at least one of the first user and a second user to the module;
  retrieving tasks associated with the at least one of the first user and the second user and the interface to the first remote application; and
  determining that the task is one of the retrieved tasks.

* * * * *